United States Patent
Davies et al.

(10) Patent No.: US 10,285,248 B2
(45) Date of Patent: May 7, 2019

(54) TRANSMITTER COMPRISING A TRANSMISSION QUEUE AND CORRESPONDING SOURCE DEVICE

(71) Applicant: SIGNIFY HOLDING B.V., Eindhoven (NL)

(72) Inventors: Robert James Davies, Eindhoven (NL); Ronald Rietman, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/524,397

(22) PCT Filed: Oct. 26, 2015

(86) PCT No.: PCT/EP2015/074688
§ 371 (c)(1),
(2) Date: May 4, 2017

(87) PCT Pub. No.: WO2016/071133
PCT Pub. Date: May 12, 2016

(65) Prior Publication Data
US 2018/0288852 A1  Oct. 4, 2018

(30) Foreign Application Priority Data
Nov. 4, 2014  (EP) .................................. 14191704

(51) Int. Cl.
*H04B 10/116*  (2013.01)
*H05B 37/02*  (2006.01)
(Continued)

(52) U.S. Cl.
CPC ......... *H05B 37/0272* (2013.01); *G08C 23/04* (2013.01); *H04B 10/116* (2013.01);
(Continued)

(58) Field of Classification Search
CPC ................ H04B 10/116; H04B 10/516; H04B 10/0795; H04B 10/504; H04B 10/524;
(Continued)

(56) References Cited

U.S. PATENT DOCUMENTS 8,942,570 B2 *  1/2015  Schenk ................ H05B 37/029
382/312
9,210,776 B2 * 12/2015  Schenk .............. H05B 37/0245
(Continued)

FOREIGN PATENT DOCUMENTS

WO  2013093408 A1  6/2013
WO  2013095654 A1  6/2013

*Primary Examiner* — Vibol Tan
(74) *Attorney, Agent, or Firm* — Meenakshy Chakravorty

(57) ABSTRACT

A transmitting device comprises a transmitter, and a controller for receiving transmission requests from a request source. The controller comprises a queue, and is configured to queue the transmission requests in order from the front of the queue backwards, and to enact the transmission request at the front of the queue by controlling the transmitter to perform the transmission of the corresponding message. The controller is further configured to detect that at least one of these transmission requests is to be treated as a repeating request, and in response, to re-insert the repeating request in the queue in one of the places farther back than the front after transmission of the corresponding message, so as to retransmit the corresponding message at least once.

15 Claims, 13 Drawing Sheets

(51) Int. Cl.
*H04B 10/516* (2013.01)
*H04B 10/548* (2013.01)
*H04B 10/69* (2013.01)
*H04B 10/54* (2013.01)
*G08C 23/04* (2006.01)
*H04L 12/863* (2013.01)

(52) U.S. Cl.
CPC ........... *H04B 10/516* (2013.01); *H04B 10/54* (2013.01); *H04B 10/548* (2013.01); *H04B 10/69* (2013.01); *H04L 47/54* (2013.01); *H05B 37/02* (2013.01)

(58) Field of Classification Search
CPC .... H04B 10/114; H04B 10/502; H04B 10/60; H04B 10/67; H04B 10/00; H04B 10/5563; H04N 5/2357; H04N 5/3532; H04L 49/90; H05B 37/0272; G08C 23/04
See application file for complete search history.

(56) References Cited

U.S. PATENT DOCUMENTS

| | | | | |
|---|---|---|---|---|
| 9,363,857 | B2* | 6/2016 | Feri | H05B 37/0272 |
| 9,386,643 | B2* | 7/2016 | Feri | H05B 37/0272 |
| 9,504,126 | B2* | 11/2016 | Gritti | H04B 10/116 |
| 9,768,867 | B2* | 9/2017 | Baggen | H04L 7/0331 |
| 9,843,386 | B2* | 12/2017 | Baggen | H04B 10/616 |
| 9,872,131 | B2* | 1/2018 | Erdmann | H04W 4/80 |
| 9,900,092 | B2* | 2/2018 | De Bruijn | H04B 10/116 |
| 10,028,358 | B2* | 7/2018 | Wendt | H05B 37/0245 |
| 2013/0029726 | A1 | 1/2013 | Berionne et al. | |
| 2015/0382438 | A1* | 12/2015 | Gritti | H04B 10/116 |
| | | | | 315/153 |
| 2016/0132031 | A1* | 5/2016 | Kozura | H04L 12/2816 |
| | | | | 700/275 |
| 2017/0170906 | A1* | 6/2017 | Holtman | G09C 1/00 |
| 2017/0223811 | A1* | 8/2017 | Vangeel | G06F 8/654 |
| 2017/0272376 | A1* | 9/2017 | Davies | H04B 10/114 |

* cited by examiner

TRANSMITTER COMPRISING A TRANSMISSION QUEUE AND CORRESPONDING SOURCE DEVICE

CROSS-REFERENCE TO PRIOR APPLICATIONS

This application is the U.S. National Phase application under 35 U.S.C. § 371 of International Application No. PCT/EP2015/074688, filed on Oct. 26, 2015, which claims the benefit of European Patent Application No. 14191704.7, filed on Nov. 4, 2014. These applications are hereby incorporated by reference herein.

TECHNICAL FIELD

The present disclosure relates to a transmitting device such as a luminaire equipped to modulate data into the light it emits. Particularly, the present disclosure relates to the queuing of requests to transmit messages from such a device.

BACKGROUND

Modern luminaires incorporate not only the components necessary to drive the luminous element (e.g. a LED string) but are capable of integrating significant additional functionality, including network connectivity and sensors of various kinds.

Coded light refers to techniques whereby data is embedded in the light emitted by a light source such as an everyday luminaire, by varying the output of the light source in accordance with a suitable signaling method. The light typically comprises both a visible illumination contribution for illuminating a target environment such as room (typically the primary purpose of the light), and an embedded signal for providing information into the environment. To do this, the light is modulated at a certain modulation frequency or frequencies, preferably a high enough frequency so as to be beyond human perception and therefore not affecting the primary illumination function. Data can then be encoded into the light by varying a property of the modulation, e.g. the frequency of the modulation, the amplitude of the modulation, or the phase of the modulation. Thus coded light provides a free-space optical communications technology that can be added as an extension to existing luminaire designs.

Coded light can be detected using an everyday 'rolling shutter' type camera, as is often integrated into a mobile device like a mobile phone or tablet. In a rolling-shutter camera, the camera's image capture element is divided into a plurality of lines (typically horizontal lines, i.e. rows) which are exposed in sequence line-by-line. That is, to capture a given frame, first one line is exposed to the light in the target environment, then the next line in the sequence is exposed at a slightly later time, and so forth. Typically the sequence 'rolls' in order across the frame, e.g. in rows top to bottom, hence the name 'rolling shutter'. When used to capture coded light, this means different lines within a frame capture the light at different times and therefore, if the line rate is high enough relative to the modulation frequency, at different phases of the modulation waveform. Thus the modulation in the light can be detected. Coded light can also be detected by using a global shutter camera if the frame rate is high enough relative to the modulation frequency, or using a dedicated photocell with suitable sample rate.

A luminaire that supports transmission of coded light signals can enable many applications of interest, including commissioning, personal control and indoor positioning.

For example, the data embedded in the illumination emitted by a luminaire may comprise an identifier of that luminaire. This identifier can then be used in a commissioning phase to identify the contribution from each luminaire, or during operation can be used to identify a luminaire in order to control it remotely (e.g. via an RF back channel). In another example, the identification can be used for navigation or other location-based functionality, by providing a mapping between the identifier and a known location of the luminaire, and/or other information associated with the location. In this case a device such as a mobile phone or tablet which receives the light (e.g. through a built-in camera) can detect the embedded identifier and use it to look up the corresponding location and/or other information mapped to the identifier (e.g. in a location database accessed over a network such as the Internet). In yet further applications, other information can be directly encoded into the light (as opposed to being looked up based on an ID embedded in the light).

SUMMARY

Often however, such applications depend on repeated transmission of a short identity or other signal. For instance, in the localization case, each luminaire will continually emit its ID as a beacon for the mobile user terminal to detect and thereby look up the location of the luminaire (and perhaps perform a more accurate localization of the mobile terminal based on the signals from multiple such luminaires, e.g. using triangulation, trilateration, multilateration or a fingerprinting based technique). Similarly in other cases such as commissioning, control or the provision of other location related information, the luminaire may be required to continually broadcast its ID or other information so that it is always available to any detecting device that happens to be in the environment at the time.

Many coded light techniques provide for the transmission of messages requested by a separate source, e.g. a luminaire control application. In this case the source (e.g. source application) issues a request to a controller of the coded light subsystem, and in response this coded light controller queues a corresponding message to be transmitted (which may have been sent in the request, or pre-stored at the coded light controller and retrieved based on the request). In the conventional case, this is a 'one-shot' event: once a message is transmitted, the respective request is discarded. Thus conventionally, the frequent transmission of a repeated message, such as a short identity signal as described above, has to be managed by the source application by sending continual requests to the coded light controller. This is a potential waste of system resources when the information to be transmitted remains identical with every transmission.

According to the present disclosure, a modification to the transmission process used by coded light allows a transmission request to remain, or 'persist', in the coded light subsystem after transmission. This enables repeated transmission without further intervention from the source (e.g. the lighting application).

Note that the disclosed technique may alternatively be applied in the case of a coded light emitter that does not have an illumination function, e.g. a dedicated coded light emitter, or an indicator light with added coded light functionality. In such cases, visible light or invisible infra-red light can be used as the medium for transmitting information. More generally in fact, the issue of requiring repeated transmission may arise in other transmission systems based on other transmission media, not just limited to light, where a source sends requests to a transmitting device and where it would be desirable to achieve repeated transmissions of the same message while avoiding repeated requests from the source. According to one aspect disclosed herein, there is provided a transmitting device (e.g. a luminaire) comprising a transmitter (e.g. comprising a lamp or other light source), and a controller for receiving transmission requests from a request source (e.g. from a luminaire control application), each of the transmission requests requesting transmission of a corresponding message from the transmitter. The controller comprises a queue for queuing data in a sequence of queue places, with the controller being configured to queue the transmission requests in respective ones of the places in order from a front of the queue backwards (i.e. front, second from front, and so forth to the back-most request in the queue), and to enact the transmission request at the front of the queue by controlling the transmitter to perform the transmission of the corresponding message. Further, the controller is configured to detect that at least one of said transmission requests is to be treated as a repeating request, and in response to re-insert the repeating request in the queue in one of the places farther back than the front (in one of the second to last places from the front) after transmission of the corresponding message, so as to retransmit the corresponding message at least once.

Thus, as the transmission request persists in the queue for at least one retransmission, then the same message (i.e. with the same payload) is retransmitted from the transmitting device without the transmitting device needing to receive any additional transmission request from the source.

Preferably the controller is configured to handle both repeating and non-repeating requests in the same queue. Hence in embodiments, the controller is configured to detect that at least one of said transmission requests, but not others, is to be treated as a repeating request, and in response to re-insert the repeating request in the queue in one of the places farther back than the front after transmission of the corresponding message, so as to retransmit the corresponding message at least once, each of the other transmission requests being discarded from the queue once the corresponding message is transmitted.

Further optional features allow further flexibility and control, allowing, for example, multiple messages including one or more persistent messages to be transmitted in an ad-hoc carousel without intervention from the controller while still allowing other, 'one-shot' messages to be transmitted.

For instance, in embodiments the controller may be configured to receive an indication (e.g. a flag) marked in said at least one transmission request, indicating that it is to be treated as a repeating request, in which case said detection comprises detecting said indication.

In particular embodiments of this, the indication may indicate how far back in the queue the repeating request is to be re-inserted in the queue after the transmission of the corresponding message, indicating one of places in the queue; the controller being configured to re-insert the repeating request at the indicated place in the queue after the transmission of the corresponding message.

In embodiments, the controller may be operable to dynamically adapt how far back in the queue the repeating request is re-inserted after the transmission of the corresponding message.

Preferably the controller is operable to remove the repeating request from the queue after one or more of the retransmissions of the corresponding message. For instance, the controller may be operable to remove the repeating request from the queue after a predetermined time, or after a predetermined number of the transmissions or retransmissions of the corresponding message (e.g. removing after three transmissions is the same as removing after two retransmissions). In embodiments, the indicator received in the request indicates said predetermined time or predetermined number.

In yet further embodiments, the indication received in the repeating request may also indicate where in the queue the repeating request is to be initially inserted in the prior to the initial transmission of the corresponding message, indicating one of the places in the queue; the controller being configured to initially insert the repeating request at the indicated place in the queue prior the initial transmission of the corresponding message. Thus requests are given the possibility of "jumping the queue".

Alternately or additionally, the controller may be configured to receive an indication marked in one of said other requests indicating where in the queue it is to be initially inserted prior to the transmission of the corresponding message, indicating one of the places in the queue; the controller being configured to initially insert said one of the requests at the indicated place in the queue prior the transmission of the corresponding message. E.g. this allows "one-shot" requests to jump to the front of the queue.

Note that where it is said herein that the controller is operable or configured to perform a certain operation, most generally this means (unless stated otherwise) that it is configured to do so in at least some situations, either unconditionally or in dependence on or more conditions, and either of its own accord or in response to a signal from elsewhere (e.g. based on an indication received in the transmission request from the source).

In embodiments, the transmission of each of the messages may comprise broadcasting the message, such as by emitting coded light into an environment.

In embodiments, the order of the queue is preferably first-in-first-out, except for said retention of the at least one repeating request; such that said other requests will appear in the queue in the order they are received, but with one or more of said other requests being held back in the queue by the at least one repeating request. That is, while all requests would normally advance forward one step after a request is handled, the effect of a persistent request is to prevent queued requests behind the insertion point from advancing as normal. Thus, all requests at and forwards of the insertion point advance one step, as normal, but all others stay where they are.

In embodiments, the controller may be configured to receive said transmission requests from a plurality of different sources (e.g. different applications).

In embodiments, the controller may be configured to receive said transmission requests from the source over a bus or network between the source and the transmitting device, or may be configured to receive said transmission requests from a plurality of remote sources over a bus or network between the sources and the transmitting device.

According to another aspect disclosed herein, there is provided a computer program product comprising code embodied on one or more computer-readable storage media and/or being downloadable therefrom, and being configured so as when run on one or more processors to perform operations of: receiving transmission requests, each requesting transmission of a corresponding message from a transmitter; queuing the transmission requests in respective places in a queue, in an order from a front of the queue backwards; enacting the transmission request at the front of the queue by controlling a transmitter to perform the transmission of the corresponding message; detecting that at least one of said transmission requests is to be treated as a repeating request; and in response to said detection, re-inserting the repeating request in the queue in one of the places farther back than the front after transmission of the corresponding message, so as to retransmit the corresponding message at least once.

In embodiments the computer program may be further configured to perform operations in accordance with any of the features of the transmitting devices' controller disclosed herein.

According to another aspect disclosed herein, there is provided a method comprising: receiving transmission requests, each requesting transmission of a corresponding message from a transmitter; queuing the transmission requests in respective places in a queue, in an order from a front to of the queue backwards; enacting the transmission request at the front of the queue by controlling a transmitter to perform the transmission of the corresponding message; detecting that at least one of said transmission requests is to be treated as a repeating request; and in response to said detection, re-inserting the repeating request in the queue in one of the places farther back than the front after transmission of the corresponding message, so as to retransmit the corresponding message at least once.

In embodiments the method may further comprise steps in accordance with any of the embodiments disclosed herein.

According to yet another aspect disclosed herein, there may be provided a source device for sending requests to a transmitting device to be queued in respective places in a transmission queue of the transmitting device in an order from a front of the queue backwards, each transmission request requesting transmission of a corresponding message from the transmitting device; wherein the source device is configured to include in at least one of said transmission requests, but not others, an indicator indicating that said at least one transmission request is to be treated as a repeating request, such that when the repeating request is received by the transmitting device, the indication will cause the transmitting device to re-insert the repeating request in the queue after transmission of the corresponding message so as to retransmit the corresponding message at least once, each of the other transmission requests being discarded from the queue once the corresponding message is transmitted; and wherein the source device is configured to use said indicator to indicate how far back in the queue the repeating request is to be re-inserted after the transmission of the corresponding message, indicating one of the places in the queue, such that the transmitting device will be controlled to re-insert the repeating request at the indicated place in the queue after the transmission of the corresponding message.

According to yet further aspects, there may be provided a corresponding computer program product or method for sending requests from a source device. In embodiments the source device, computer program and/or method may send requests in accordance with any of the transmission request features disclosed herein.

BRIEF DESCRIPTION OF THE DRAWINGS

To assist understanding of the present disclosure and to show how embodiments may be put into effect, reference will be made by way of example to the accompanying drawings in which.

DETAILED DESCRIPTION OF EMBODIMENTS

As discussed, modern luminaires incorporate not only the components necessary to drive the luminous element (e.g., a LED string) but are capable of integrating significant additional functionality, including network connectivity and sensors of various kinds. One such function is the transmission of information by modulation of the light emitted by the luminous element. This may be achieved by varying the light intensity in some manner, though other methods are known, such as varying the frequency or phase of the modulation. There are a number of uses for such a transmission function, such as the transmission of an identifier signal that allows a receiver to identify the source of the light. This enables such applications as indoor positioning, lighting control and system commissioning.

Figure 1:
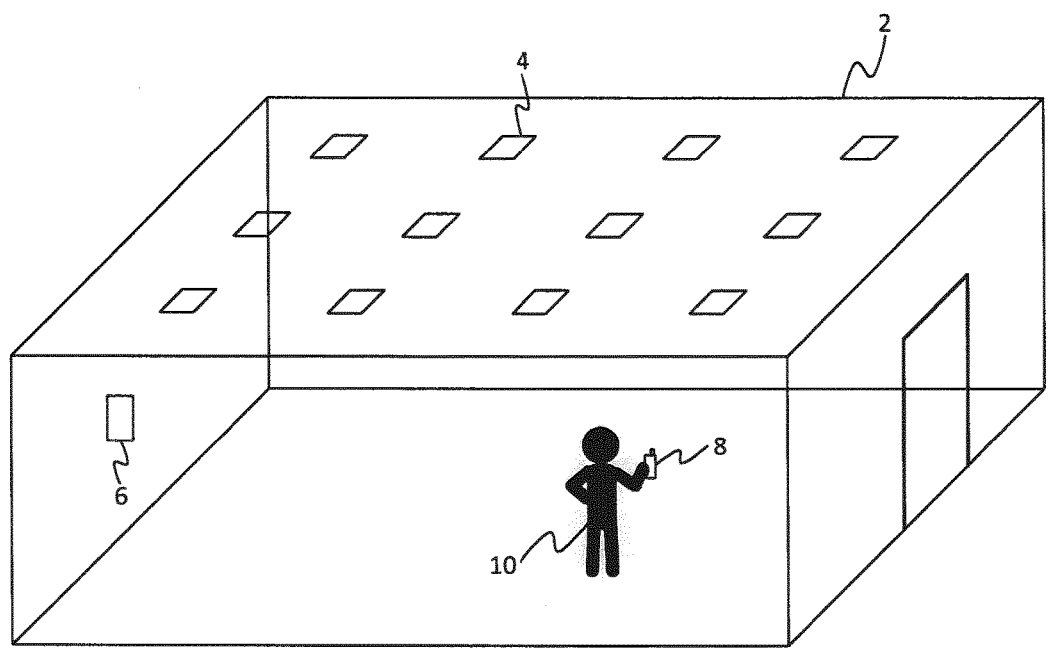
FIG. 1 is a schematic illustration of an environment including a lighting system.

FIG. 1 illustrates an example of a localization network implemented through a lighting system by means of coded light. The lighting system comprises a plurality of luminaires 4 installed or otherwise disposed at different respective locations within an environment 2. For example the environment 2 may comprise an indoor space such as one or more rooms, corridors and/or halls; or an outdoor space such as a garden, park, sports field and/or campus; or a partially covered space such as a stadium; or any combination of such spaces or others. Each of the luminaires 4 comprises at least one lamp (i.e. the luminous element) and any associated socket, housing and/or support; with the lamp taking any suitable form such as a string or array of LEDs, or an incandescent bulb. For example each of the luminaires 4 may take the form of a ceiling or wall mounted light fixture, or a free standing unit. The luminaires 4 have a primary function of providing illumination for illuminating the environment 2, so that human occupants can see within the environment 2.

Furthermore, each of some or all of the luminaires 4 is configured to embed a signal into the illumination it emits (e.g. by amplitude modulation, frequency modulation or phase modulation). Particularly, in the example of the localization network, each of these luminaires 4 is allocated an identifier (ID) that is unique within the system in question, and each such luminaire 4 is configured to continually broadcast its ID into the environment encoded into the respective illumination which it emits.

If a mobile device 8 is present in the environment 2 and equipped with a suitable coded light receiver, e.g. a rolling-shutter camera plus associated coded light decoder application, then the mobile device 8 can detect the IDs of any luminaires 4 in range. Using the respective ID(s), the mobile device 8 then looks up the locations of one or more of the detected luminaires 4 in a look-up table or other database mapping the IDs to the respective locations within the environment 2 (e.g. in terms of map grid reference or location on a floorplan). For instance the table or database may be stored locally on the mobile device 8, or the mobile device may access the table or database from a remote location such as a server (comprising one or more server units at one or more sites). E.g. the mobile device 8 may access the table or database via a communications network such as the Internet, by forming a wireless connection to that network via a wireless access point or router 6 disposed within the environment 2. This may be achieved using any suitable wireless access technology, e.g. a radio access technology such as Wi-Fi, ZigBee or Bluetooth.

From this information on the location of one or more of the luminaire(s) 4, the mobile device 8 can also make an estimate of its own location. For instance, this may be achieved by assuming the location of the mobile device 8 is approximately that of the nearest or only visible luminaire 4 (e.g. the nearest can be determined based on signal strength or time of flight measurements of the received signals). Or to get a more refined estimate, the mobile device 8 may determine its location by combining measurements (such as the signal strength or time of flight) of the signals received from multiple visible luminaires 4 using a technique such as triangulation, trilateration, multilateration or fingerprinting. As a variant of this, the mobile device 8 may submit measurements to a location server for the localization determination to be performed here (e.g. submitting the measurements over the Internet or another network via a wireless access point or router 6 in the environment 2).

In many applications of such technology, the mobile device 8 is a mobile user device 8 of a user 10, disposed about the user's person, and the estimate of the location of the mobile user device 8 is used as an estimate of the location of the user 10. E.g. the mobile user device 8 may be a smartphone, tablet or laptop carried by a user 10, or perhaps a tracking tag worn by the user 10.

It will be appreciated that this is just one example of an application of coded light, and the techniques disclosed herein are also applicable to any other applications where repeated transmission of a signal is involved. E.g. in another application, the IDs emitted by one or more of the luminaires 4 may be used by the mobile device 8 to look-up other location-related information such as information on an exhibit in a particular room of a museum, or location related price information; or such information may even be embedded directly into the illumination from the luminaires 4 rather than requiring a look up based on ID. In another example application, the IDs emitted by the luminaires 4 may be used by a commissioning technician—with suitable device 8 and application—to isolate a respective illumination footprint in the environment 2 due to each of the different luminaires 4, and to use this information to inform the commissioning process.

Figure 2:
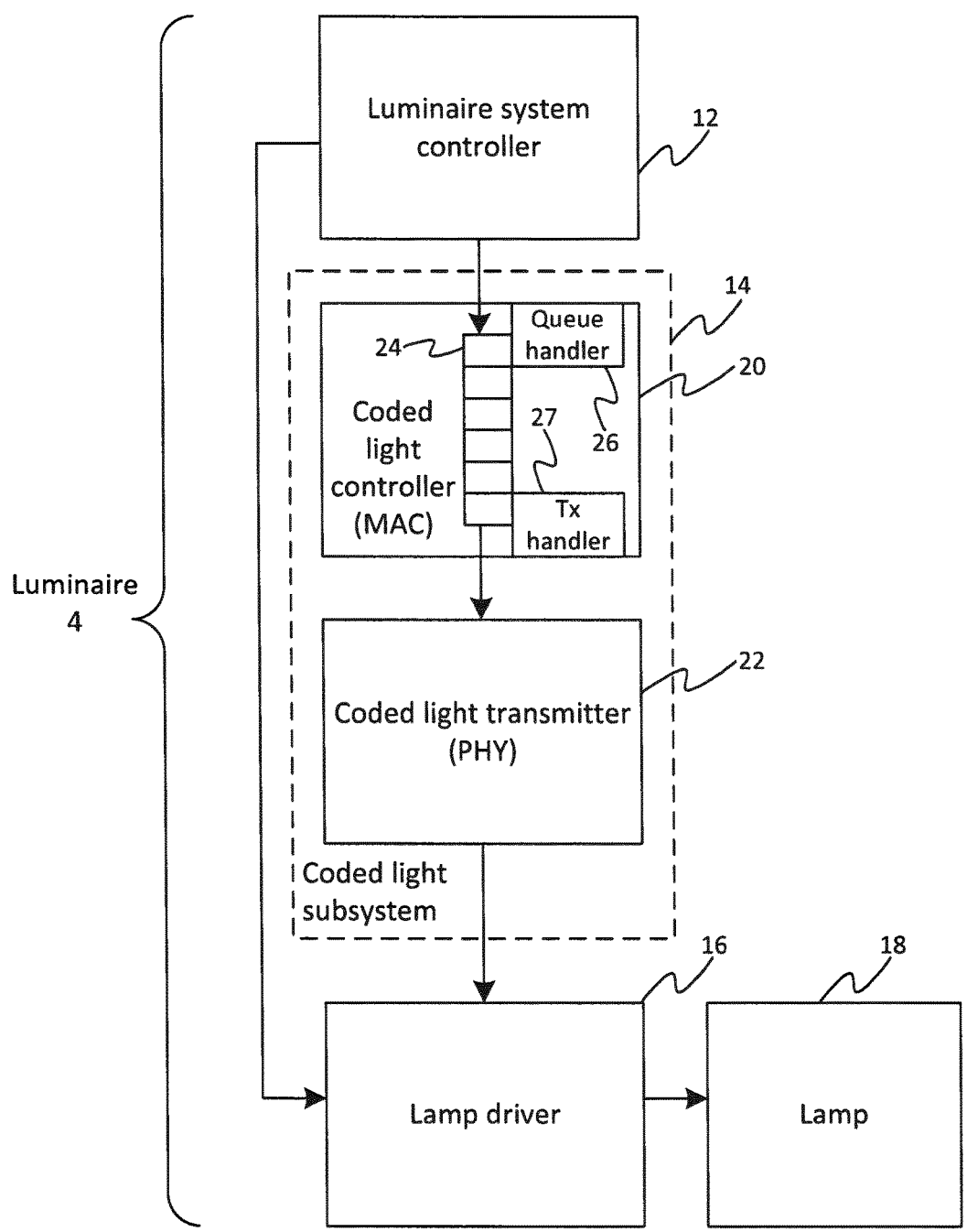
FIG. 2 is a schematic block diagram of a luminaire.

FIG. 2 illustrates an example luminaire 4 suitable for use in the above applications and/or others. The luminaire 4 comprises a luminaire system controller 12, and a coded light subsystem 14 coupled to the luminaire system controller 12. The luminaire system controller 12 is responsible for managing the overall behavior or operation of the luminaire 4 including both its illumination function (e.g. controlling dimming and/or color of the emitted illumination) and its coded light function. To control the coded light function, the luminaire system controller 12 is configured to generate transmission requests requesting that the coded light subsystem 14 transmits a coded light message in the illumination emitted by the luminaire 4. In embodiments the luminaire system controller 12 may take the form of a software application stored on one or more memory devices of the luminaire 4 and arranged to run on one or more processors of the luminaire 4 (memory and processor not shown). However, it is not excluded that the luminaire system controller 12 could instead be implemented wholly or partially in dedicated hardware circuitry, or hardware configurable or reconfigurable circuitry such as a PGA or FPGA, or a combination of hardware and software.

The coded light subsystem 14 comprises a coded light controller 20, which is arranged to receive the transmission requests from the lighting system controller 12. The coded light subsystem 14 further comprises a coded light transmitter connected to the coded light controller 20; and the luminaire 4 further comprises a lamp driver 16 connected to the coded light transmitter 22, and a lamp 18 (e.g. an LED based lamp) connected to the lamp driver 16. The coded light controller 20 is configured to use the coded light transmitter 22 to control the lamp driver 16, and thereby transmit messages by encoding the messages into the light emitted by the lamp 18. Particularly, the coded light controller 20 is configured to control the coded light transmitter 22 to transmit these messages (via the driver 16 and lamp 18) in response to respective ones of the transmission requests received from the luminaire system controller 12. Note that there are at least two possibilities for this: the message may be included in the respective transmission request as received from the luminaire system controller 12; or alternatively the message may not be included in the transmission request itself, but rather the message is looked-up at the coded light controller 20 based on the respective transmission request from the luminaire system controller 12 (in embodiments being pre-stored at a local storage location of the coded light controller 20 and retrieved therefrom based on the respective transmission request).

Note also, in some embodiments the coded light controller 20 may be equipped with a mechanism (not shown) for returning replies back to the luminaire system controller 12, e.g. via the same network as used to receive the transmission requests, and/or a separate back channel. For instance this may be used for the coded light controller 20 to send confirmation back to the luminaire system controller 12 confirming that a requested message was successfully transmitted from the luminaire 14.

In embodiments the coded light controller 20 and coded light transmitter 22 are implemented in software stored on one or more memory devices of the luminaire 4 and arranged to be run on one or more embedded processors of the luminaire 4 (memory and processor not shown). However, it is not excluded that one or both of these could be implemented wholly or partially in dedicated hardware circuitry, or hardware configurable or reconfigurable circuitry such as a PGA or FPGA, or a combination of hardware and software.

The job of the coded light controller 20 is to act on the transmission requests generated by a source such as a controller application located elsewhere in the system, by arranging for the lamp to emit a signal that corresponds to the information contained and/or referred to in the transmission request. As discussed, in one approach to the design of a luminaire that supports coded light functionality, the main controller of the luminaire is the luminaire system controller 12, an entity that, logically, sits on top of the coded light controller 20 and which causes it to transmit a signal via the light emitted by the lamp 18.

The lamp driver 16 provides power to the lamp 18 according to a so-called set-point setting provided by the luminaire system controller 12. The interface between the coded light controller 20 and the lamp driver 16 is provided by the coded light transmitter 22, which maps the signal formatted by the coded light controller 20 onto an implementation-specific modulation port provided by the lamp driver 16 that allows modulation of the instantaneous light output. Thus, when the luminaire system controller 12 wishes to transmit a signal in the light output from the luminaire 4, it sends a transmission request to the coded light controller 20, and the coded light controller 20 generates the corresponding signal in accordance with the relevant coded light protocol and then instructs the coded light transmitter 22 to transmit it via the lamp driver 16.

Figure 3:
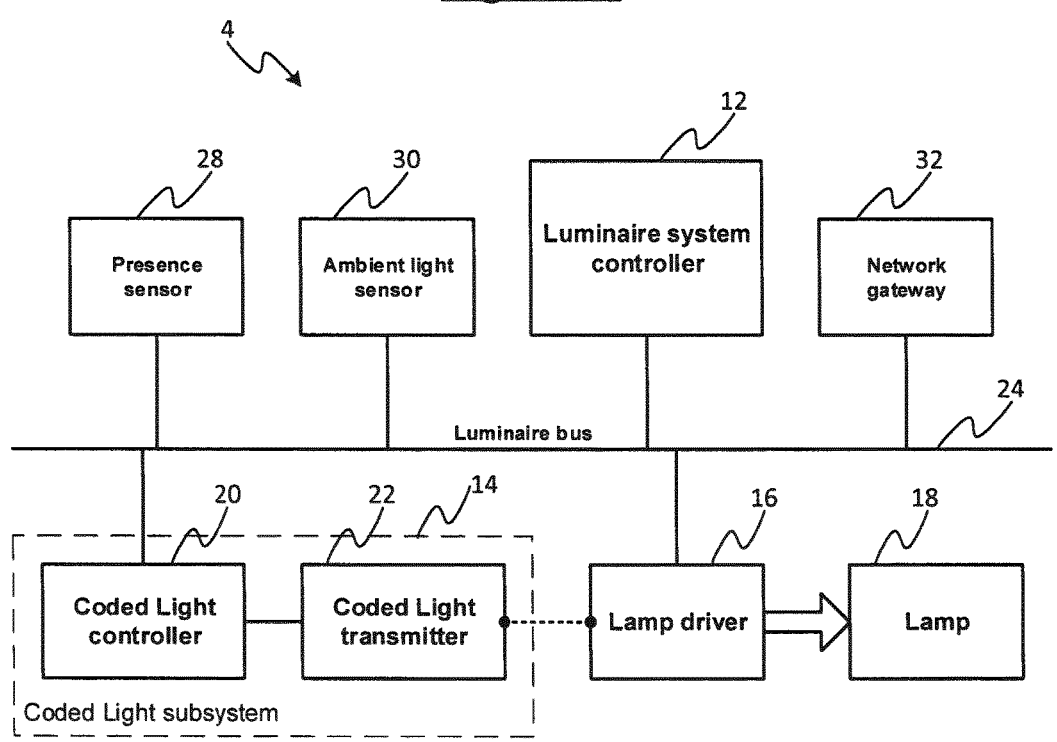
FIG. 3 is a schematic block diagram of another luminaire.

FIG. 3 illustrates an alternative, modular and distributed approach to luminaire design. In this example, the luminaire 4 again comprises a luminaire system controller 12, a coded light subsystem 14 (comprising a coded light controller 20 and a coded light transmitter 22), a lamp driver 16, and a lamp 18, and optionally other modules such as a presence sensor 28, an ambient light sensor 30 and/or a network gateway 32 (e.g. wireless network gateway). However, in the example of FIG. 3, the lamp driver 16, coded light controller 20 and luminaire system controller 12 are interconnected via a luminaire bus 25, which may also be shared with a number of other modules such as a presence sensor 28, ambient light sensor 30 and/or network gateway 32. The network gateway 32 may use wired technology, like Ethernet, or wireless technology, like Zigbee, to link multiple such luminaires 4 together with a central lighting controller or building management system, or to link multiple such luminaires 4 together in a decentralized peer-to-peer lighting network. The presence sensor 28 and ambient light sensor 30 provide local environmental information that can be used as input by the luminaire system controller 12 when setting the desired illumination output (e.g. desired dimming level and/or color).

Other functions (e.g. lamp diagnostics) can be added, as desired, using the same modular approach. It can also be noted that, while this approach supports the use of discrete hardware modules, it does not require it; a single hardware module could support more than one application, and application might nevertheless retain the bus model of inter-process communication. Further, in a fully-integrated system, the modular architecture may be only visible in software with even the luminaire bus 25 being a software construct.

A particular aspect of the modular approach as shown is that the luminaire system controller 12 is (at least logically) remote from the coded light controller 20, and communication between the two entities takes place via the luminaire bus 25. In this version, the luminaire bus 25 is a shared resource and may have limited data capacity and limited support for low latency operation. By comparison, communications between the coded light controller 20 and the transmitter 22 can be very time critical. For this reason, the link between the two is preferably still a dedicated link that does not use the services of the luminaire bus 25.

In yet further alternatives, the luminaire system controller 12 need not be part of the luminaire 4, but could instead be external to the luminaire 4 in that it is not incorporated in the same housing as the luminaire 4, and in embodiments may be physically remote in that neither does it mate directly with the luminaire 4 but instead is coupled to it by some non-adjacent link, either by a cable or a wireless link, e.g. via a wired or wireless network. For instance, the luminaire system controller 12 may take the form of a central controller of the lighting system, or other remote control module. In embodiments it may for example be implemented as a software application running on a remote server or user terminal. In terms of the connection with the luminaire 4, the luminaire system controller 12 may be arranged to send the transmission requests to the coded light controller 20 of the luminaire 4 via a lighting network, e.g. a wired network such as an Ethernet and/or DMX network, and/or a wireless network such as a Wi-Fi, ZigBee and/or Bluetooth network (in which case the requests may be sent either directly or via an intermediate wireless node such as a wireless router or access point 6, which may or may not be the same router or access point used by the mobile device 8 to access the Internet).

Furthermore, note that the luminaire 4 may either be the only luminaire controlled by the luminaire system controller 12, or may be one of a plurality of such luminaires 4 controlled by the luminaire system controller 12. For illustrative purposes the following will be described in relation to a given luminaire 4, but it will be appreciated that the techniques disclosed herein can be extended to a luminaire system controller 12 or other such source sending requests to multiple luminaires over a lighting network. Further, the (or each) luminaire 4 may be arranged to receive transmission request from either a single source or multiple different sources, e.g. multiple different software applications. The following may be described in terms of a particular source in the form of the luminaire system controller 12, but it will be appreciated that the techniques disclosed herein can apply in relation to transmission requests from multiple sources.

Whatever the arrangement between the system controller 12 and coded light controller 20, the application (or applications) served by such a system typically requires the luminaire 4 to repetitively broadcast a signal to one or more receiving devices 8 in the environment 2. It would be desirable to keep the traffic between the system controller 12 and the coded light controller 20 (e.g. across the luminaire bus 25) to a minimum even in the case where the luminaire 4 is required to send a repetitive signal.

Figure 4:
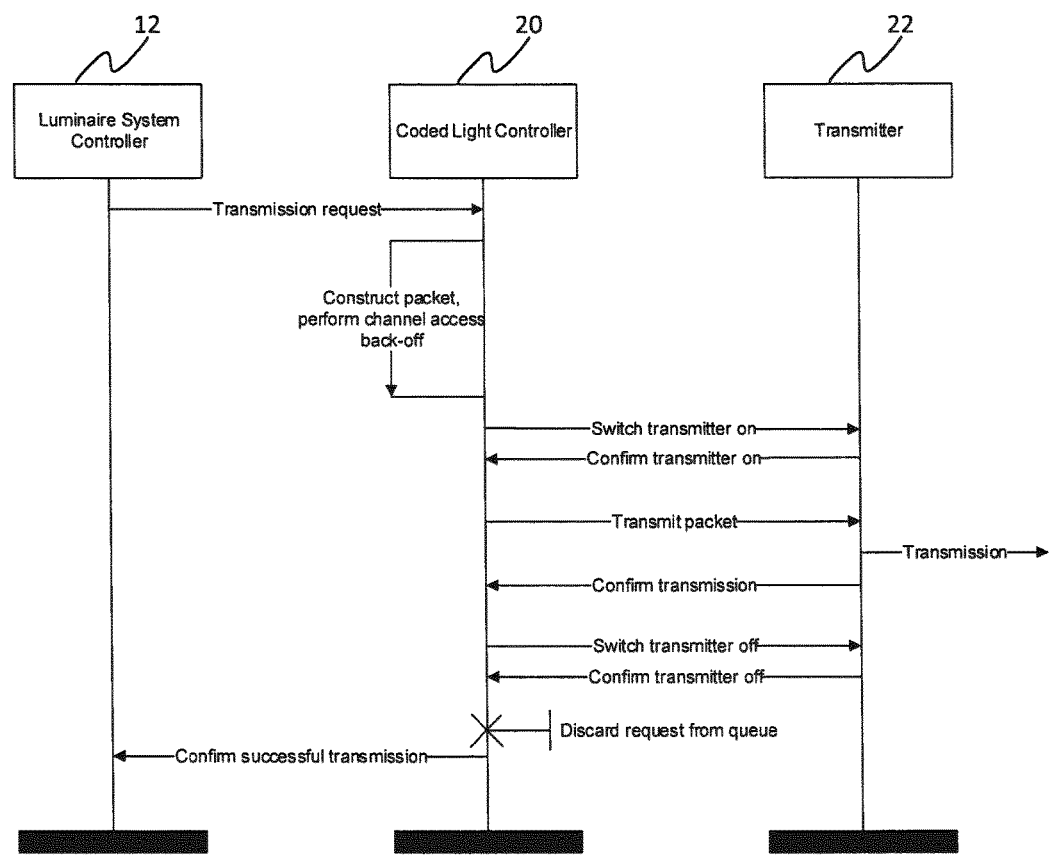
FIG. 4 is a schematic signaling chart of a transmission process.

An example of the transmission process is shown in the message sequence chart of FIG. 4. This shows the dialogue between the luminaire system controller 12 and the coded light controller 20, and the dialogue between the coded light controller 20 and the coded light transmitter 22. The steps of the transaction can be summarized as follows.

The luminaire system controller 12 issues a transmission request to the coded light controller 20 containing the message to be sent. In response, the coded light controller 20 generates a data packet for transmission and performs a channel access back-off. The coded light controller 20 also requests that the transmitter 22 be set to the 'on' state, and the transmitter 22 confirms success of this to the coded light controller 20. The coded light controller 20 then delivers the packet to the transmitter 22, and the transmitter 22 transmits the packet by modulating the output of the lamp driver 16. The transmitter 22 confirms success of this back to the coded light controller 20. The coded light controller 20 then requests that the transmitter 22 is set to the 'off' state, and transmitter 22 confirms success of this to the coded light controller 20. Following this, the coded light controller 20 discards the request and confirms the successful transmission to the luminaire system controller 12, in response to which the luminaire system controller 12 considers the transaction to have completed.

Note the internal dialogue shown in FIG. 4 between the coded light controller 20 and coded light transmitter 22 concerns the setting of the transmitter 22. While details may differ between implementations, the use of a dedicated link keeps this traffic away from the luminaire bus 25.

In embodiments, the coded light is transmitted based on a protocol stack comprising a logical link control (LLC) layer, a medium access control (MAC) layer, and a physical (PHY) layer. Together, these provide a transmission service that includes facilities such as:

switching and multiplexing of data streams (LLC),
channel access (MAC),
error protection (MAC), and/or
transmitter control (PHY).

Many communications protocols support a similar structure and will contain a layer or sublayer that offers similar functions to the coded light MAC. Although the following may be described in terms of certain protocol stack layers, it will be appreciate that the teachings herein are not necessarily limited to any particular protocol structure.

In embodiments, the functionality of the MAC layer is substantially implemented by the entity referred to as the coded light controller 20, while the functionality of the PHY layer is substantially implemented by the coded light transmitter 22. Together these form the coded light subsystem 14.

For each request that is handled, the MAC 20 will construct a packet containing a number of fields and subfields. In embodiments, these fields may be broadly classified as follows.

Internal MAC protocol field information: information about the type of packet and the layout of fields within it. This may also contain a modulo counter or other element that changes on a per-packet basis.

Payload data: one or more units (e.g. octets) of data supplied in the transmission request.

Reference data: one or more units (e.g. octets) of data stored within the MAC but referenced by the transmission request. Typically, this is a source address or other identifying signal that might be factory-coded or in some way field-programmable and which the request originator asks to be included in the transmitted packet.

Checksum: a field appended to the packet that carries the result of a cyclic redundancy check (CRC) or equivalent calculation that takes into account most or all of the remaining contents of the packet.

This packet constitutes the message to be transmitted by the luminaire 4. Note that at least some of the information that the luminaire system controller 12 wishes the lamp 18 to emit may be pre-stored in the MAC 20 and need only be referred to, not supplied, in the request. Also, the MAC protocol may, for its own reasons, change elements of the protocol fields, like a modulo counter that is incremented with every transmission. This means that dependent fields, like the checksum, may need to be recalculated with every retransmission of a packet even if the data fields are unchanged. Accordingly, when discussing the operation of the queue, the following is described in terms of queuing requests, not packets.

Coded light protocols do not necessarily require one transaction request to complete before the luminaire system controller 12 issues another request. Therefore the coded light controller 20 comprises a queue 24 in which asynchronous transmission requests may be stored by the MAC (or they may alternatively be rejected, e.g. if the queue is full). The queue 24 comprises a sequence of queue places, i.e. a sequence of slots or queue positions, each for holding a respective one of the transmission requests in order from front to back (i.e. a one dimensional sequence). Note that the terms "place", "position" "slot", and "sequence" as used herein do not necessarily imply that the requests must have a fixed or even size or that the slots or places are of a fixed or even size (though that is one possibility in embodiments). Nor do these terms necessarily imply any particular queue structure or implementation, e.g. they do not necessarily imply that the queue is of a fixed length.

Generally, the queue 24 can be implemented in a number of different possible ways. Firstly, the queue 24 may be implemented for example in hardware registers, or in memory (e.g. as a linked list or table of pointers). Further, a queue may be fixed length, or alternatively can be configured to be dynamic. For instance, an example of a fixed length queue is a cyclic fixed length buffer, while an example of a dynamic length queue is a variable sized linked list implementation in a memory. Take for example a queue which is constructed in as a dynamically linked list in a memory array: there are not necessarily slots in the sense of hardware slots, slots of fixed length, or slots of a fixed set of slots, and in some embodiments the number of slots may vary; but nonetheless the functionally is still very much that of a queue. The choice may affect implementation to some extent, for instance in that in a static fixed length FIFO one may refer to one of a fixed set of slot numbers, whereas in a cyclic fixed length buffer, the slots may be referred to relative to the front of the queue. E.g. in a static sized array based implementation there may be a front index and a rear index; while in a dynamically linked list implementation there are two pointers, a pointer to the front slot, a pointer to the rear slot, and a variable number of slots, wherein every slot consists of the value it holds and a pointer to the next slot in the queue (singular linked list). But nonetheless, a queue as referred to herein is to be understood in terms of its function, and is not limited to any particular implementation.

When a transmission request is received from the luminaire system controller 12, the request enters at the back of the queue 24 and makes their way to the front. When the queue is not empty, the MAC 20 will immediately take the request at the front of the queue and process it for transmission. After transmission, the request is discarded. Alternatively if the queue is full when the transmission request arrives from the luminaire system controller, it may be rejected. This behavior may be considered as the result of two independent processes: a queue handler 26 that handles incoming requests and decides whether to place them in the queue or to reject them; and a transmission handler 27 that picks up the request, if any, at the front of the queue and handles the transmission process.

Figure 5:
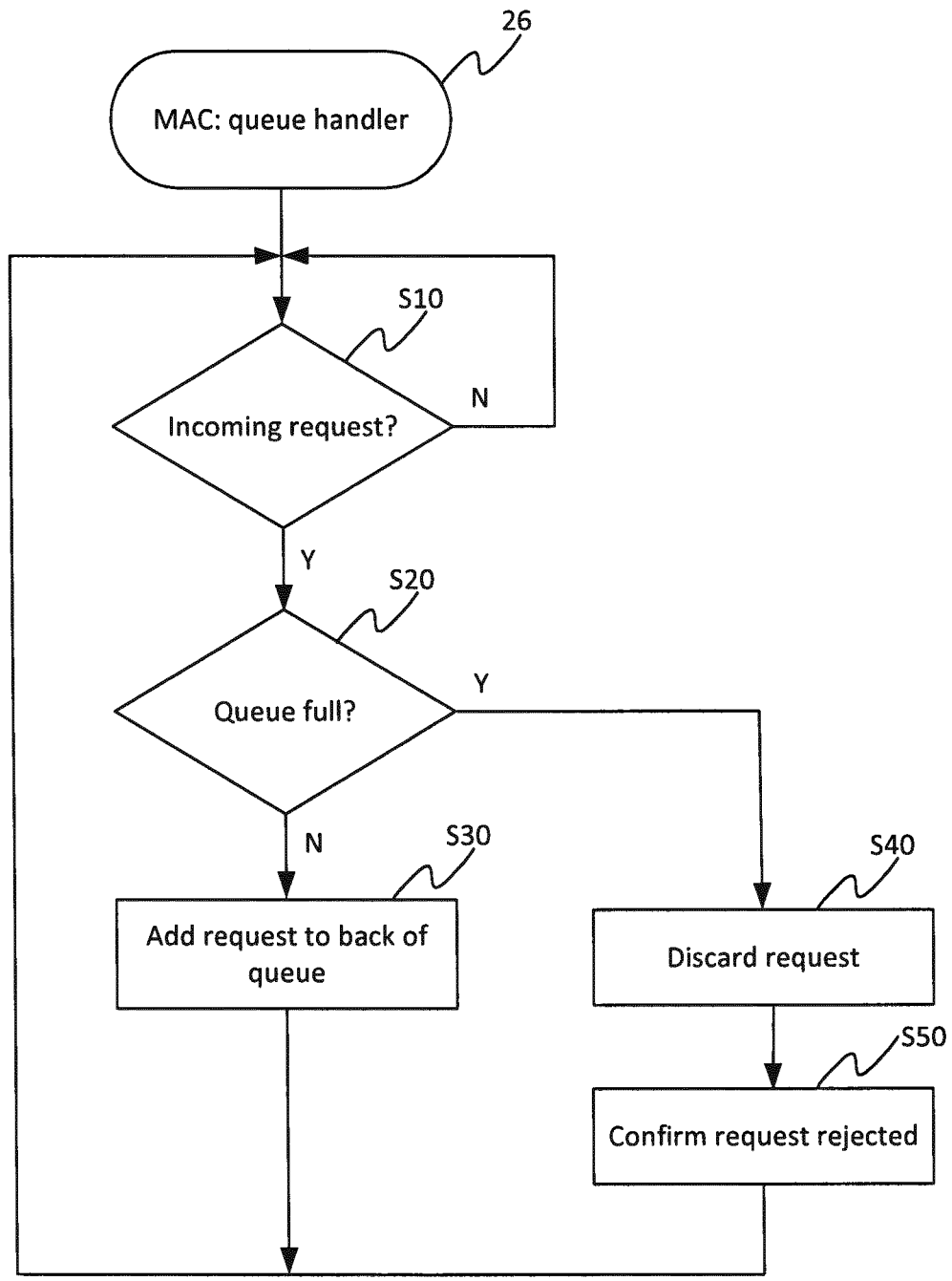
FIG. 5 is a schematic flow chart of a process performed by a queue handler.

The flow chart of FIG. 5 illustrates an example behavior for the queue handler 26. At step S10, the queue handler looks for an incoming request, and when an incoming request is received, proceeds to step S20 where the queue handler 26 checks to see if there is room on the queue for the new request. If so, at step S30 the request is added at the back of the queue. If not, the process branches to step S40 where the request is discarded, and then at step S50 a message confirming rejection is sent to the originator 12. Either way, the process continually loops back to the top (step S10) to continue to monitor for further incoming requests.

Figure 6:
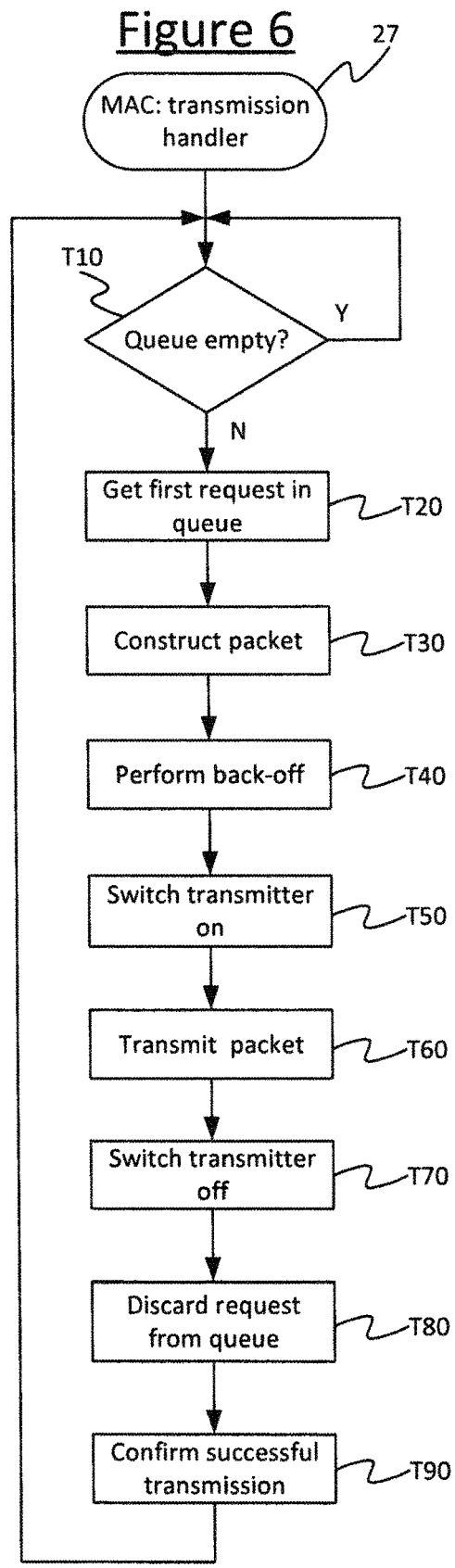
FIG. 6 is a schematic flow chart of a process performed by a transmission handler.

The flow chart of FIG. 6 shows an example behavior of the MAC layer request transmission handler 27 within the coded light controller 20. At step T10, the transmission handler 27 checks whether there are any requests in the queue, and if so proceeds to step T20 where it takes the next request at the head of the queue 24. At step T30 the transmission handler 27 constructs a message packet based on this request, at step T40 it performs a back-off (see also FIG. 4), at step T50 it switches the transmitter 22 on, and at step T60 it transmits the packet via the transmitter 22. At step T70 the transmission handler 27 then turns the transmitter 22 back off again, and at step T80 discards the request from the queue 24. It step T90 it then confirms successful transmission back to the luminaire system controller 12. The process operates as a continuous loop (back to T10) so that requests are processed continuously unless the queue is empty.

Figure 7:
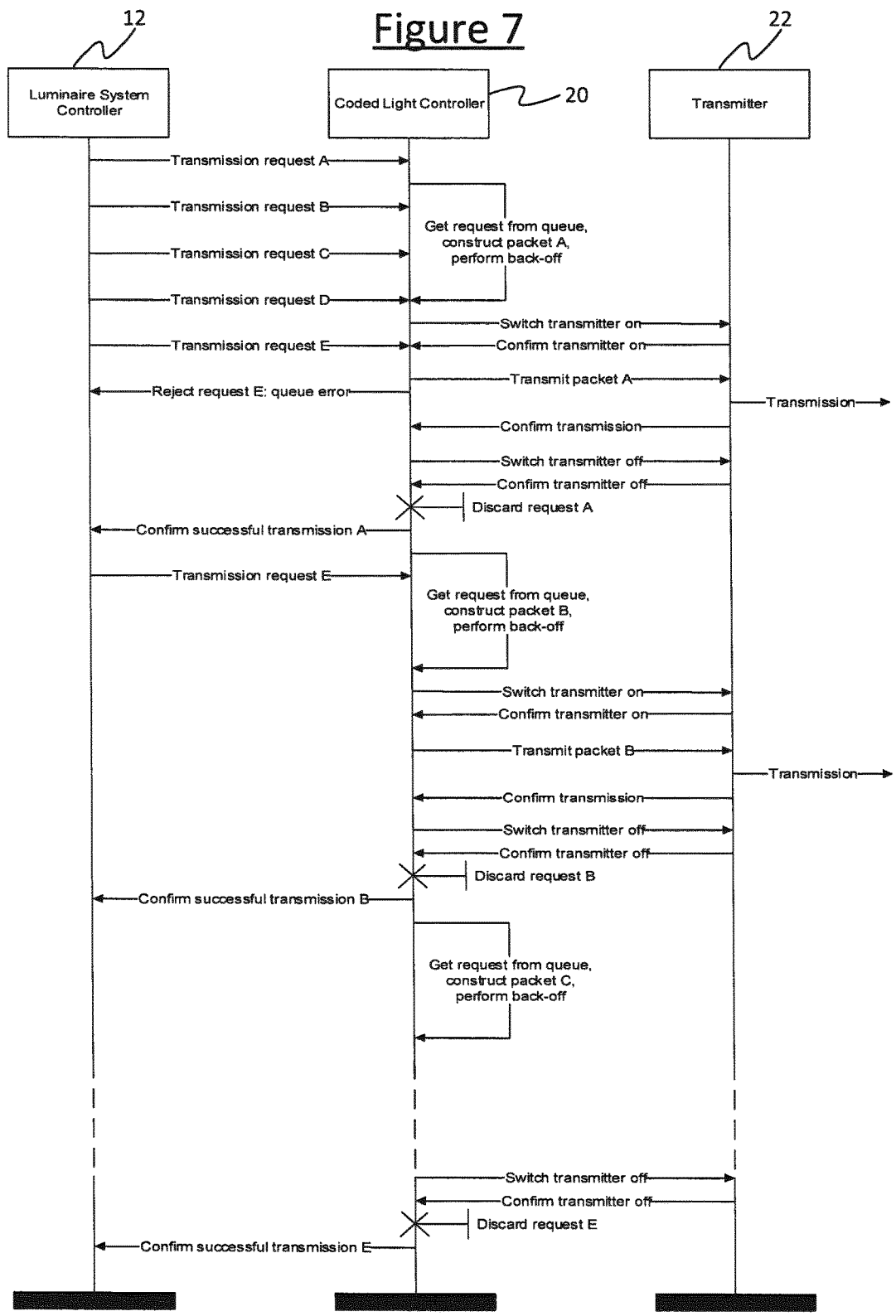
FIG. 7 is a schematic signaling chart of another transmission process, FIG. 8 schematically illustrates a request queuing sequence, FIG. 9 schematically illustrates another request queuing sequence, FIG. 10 schematically illustrates another request queuing sequence.

FIG. 7 gives a message sequence chart showing an example of the transmission process when involving a queue 24. The queue handler 26 operation can be seen in the exchange between the luminaire system controller 12 and the coded light controller 20, and the transmission handler 27 operation can be seen in the an exchange between the coded light controller 20 and the transmitter 22. In this example it is assumed by way of illustration that the queue is only four slots long. If the luminaire system controller 12 sends five requests A . . . E to the coded light controller 20, arriving asynchronously, then the coded light controller queues the first four requests A . . . D and begins transmitting the message requested by the first request A according to the process described in relation to FIG. 4. However, the fifth request E is rejected, and so has to be resubmitted by the luminaire system controller 12 after the completion of request A. Each of requests B . . . E is then processed, again as in FIG. 4, including the fifth request E once it has successfully made it into the queue 24.

The rules for queue management may be summarized (so far) as follows:
whenever the queue 24 is non-empty, the MAC 20 will process the request at the front of the queue 24;
all new requests join at the back of the queue 24 (or, if the queue is full, are rejected); and
after transmission, requests are discarded from the queue 24.

Figure 8:
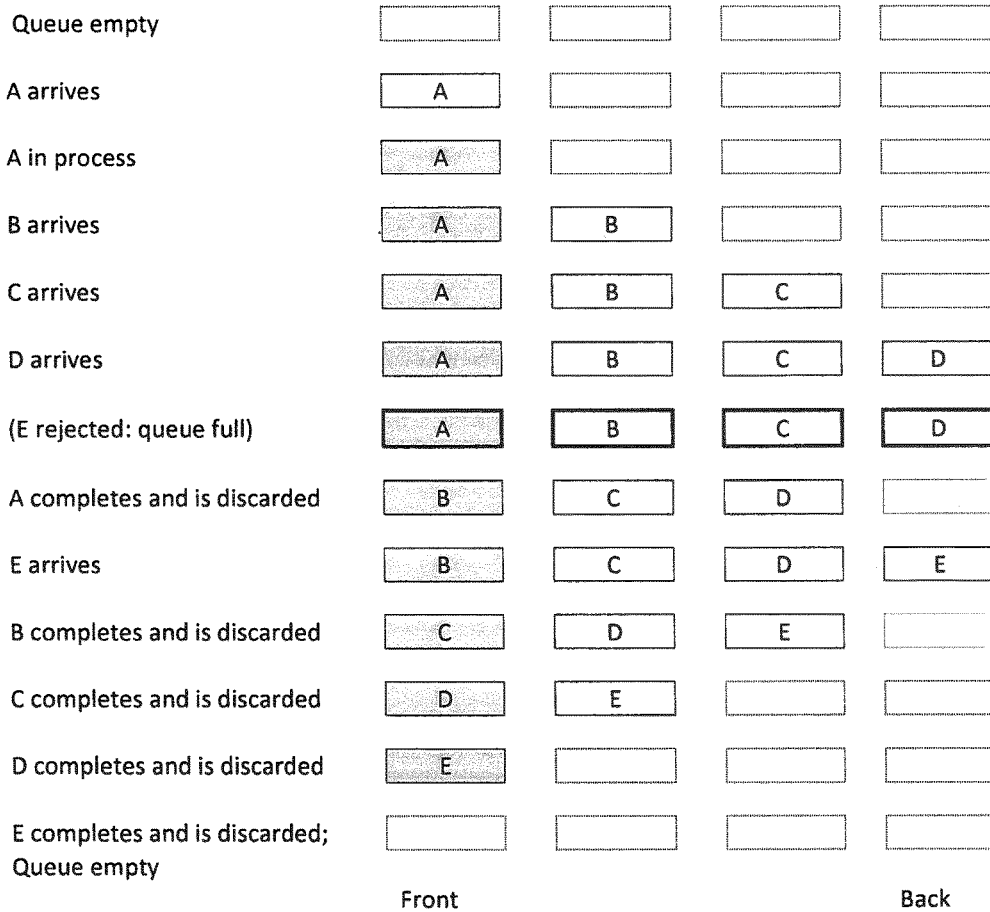

FIG. 8 gives a chart showing step-by-step changes in the queue 24. This shows the progress of the five transmission requests, A to E. As soon as request A arrives, the coded light controller 20 picks it up from the queue 24 and processes it for transmission. Meanwhile, requests B, C and D arrive and are placed in the queue 24. As long as the queue 24 is not empty, the coded light controller 20 will process each request in the order they arrived, finishing with request E.

Figure 9:
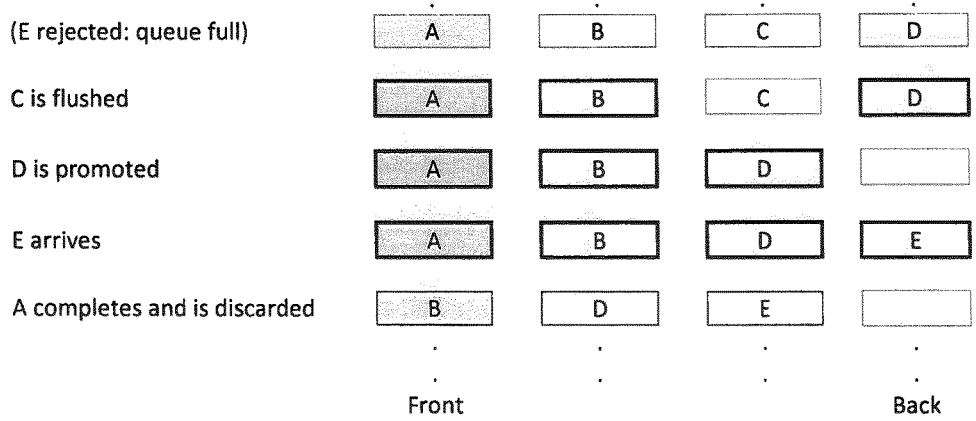

In embodiments, the coded light controller 20 is configured with a mechanism to allow the luminaire system controller 12 to remove a pending request from the queue 24. Thus, if after issuing a transmission request the luminaire system controller 12 subsequently decides that the request is no longer needed, it may issue a 'flush' or 'purge' command that causes the request to be removed from the queue 24 and discarded without transmission (expected behavior if the request has reached transmission stage by the time the flush request arrives is implementation dependent; in embodiments, it is assumed that the transmission is allowed to complete before the request is discarded). FIG. 9 illustrates an example scenario in which failure to have request E accepted causes the luminaire system controller 12 to sacrifice request C from the queue. Request C is flushed, or discarded, D takes its place and makes space for E to join at the back of the queue 24.

Turning now to the question of repetition, as stated previously, it is often a requirement of the application to send the same packet repeatedly. As an example, an indoor positioning application might require each luminaire 4 in a location to broadcast a unique identifier that can be matched to the location. Since it is, in general, not possible to assume when a receiver 8 might be listening, the luminaire 4 is obliged to send its identifier repeatedly whenever a receiver 8 might be expected to be within range.

With the system as described above, each repetition is performed according to the same general process. In particular, the dialogue between the luminaire system controller 12 and coded light controller 20 is performed for each transmission. This is true despite the fact that the dialogue for each transmission is essentially identical. Since, in some embodiments, this can unnecessarily consume resources of the bus and/or processor resources of the luminaire system controller 12, it would be desirable to provide a method of eliminating this traffic yet still implementing the repetition.

To address this desire, according to embodiments disclosed herein the transmission process is modified so that the transmission request is not discarded after transmission but remains in the queue 24. As a result, during a subsequent transmission cycle, it is again picked up and a new data packet generated and transmitted. Again, it is not discarded after transmission and, again, remains in the queue. Thus, the technique takes advantage of the queue operation to achieve the repetition that is desired.

Figure 10:
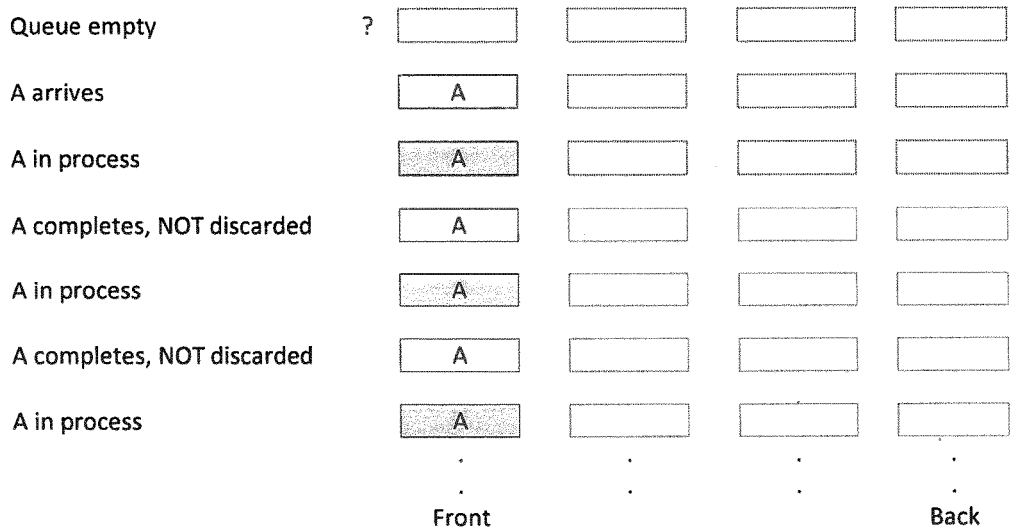

This mode of operation may be referred to herein as 'persistence mode'. because the transmission request persists in the system after transmission: a single persistent transmission request thus results in multiple packet transmissions. In the illustration of FIG. 10, request A arrives as a persistent request. After processing, the discard step is skipped and A remains in the queue. As a result, a subsequent transmission cycle picks up A again and retransmits it (the next transmission cycle if there are no other requests in the queue 24).

Figure 11:
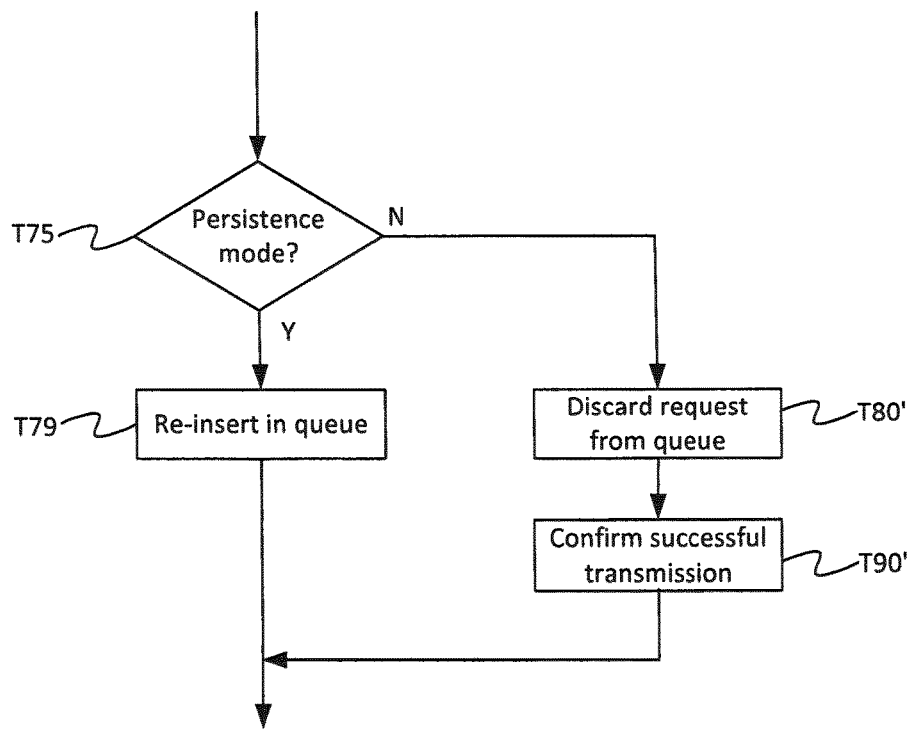
FIG. 11 is a portion of a schematic flow chart showing steps of a transmission process, FIG. 12 schematically illustrates a system of indices for referring to queue places, FIG. 13 schematically illustrates another message queuing sequence, FIG. 14 schematically illustrates another message queuing sequence, FIG. 15 schematically illustrates yet another message queuing sequence.

As shown in FIG. 11, the MAC request handler 26 is modified by replacing the 'Discard request from queue' step T80 and the 'Confirm successful transmission' step T90 of FIG. 6 with a check for persistence mode. Following Step T60, the MAC transmission handler 27 proceeds to step T75 where it checks whether persistence mode is specified for the current request whose message has just been transmitted. If so, it branches to step T79 where it re-inserts the request back in the queue. Otherwise, it proceeds to step T80' where it discards the request from the queue and then step T90' where it confirms successful transmission, similarly to steps T80 and T90 described in relation to FIG. 6.

Thus if persistence mode is active, the request is re-inserted in the queue. The discard step is not performed and, in the spirit of reducing traffic between luminaire system controller 12 and coded light controller 20, the confirmation step is also not performed (though optionally the confirmation step T90' could be included following the persistence mode as well, depending on implementation).

The rules for queue management now become:
- whenever the queue 24 is non-empty, the MAC20 will process the request at the front of the queue;
- all new requests join at the back of the queue 24 (or, if the queue is full, are rejected); and
- after transmission, requests are discarded from the queue 24, or, if persistent, re-inserted back in the queue.

Thus the message requested by a persistent-mode request will be retransmitted at least once by virtue of being re-inserted back into the queue. That is, the same message (with the same payload) is transmitted again from the coded light controller 20 (and transmitter 22 and lamp 18) without a corresponding re-submission of the request from the luminaire system controller 12.

Selection of the mode, 'normal' or 'persistence', may be controlled in a number of ways. According to embodiments, one way is to include a 'persistence' indicator with each packet request from the source 12, e.g. in the form of a flag, indicating whether the request is to be treated as 'normal' or 'persistent'. This flag may be combined with other status information in a combined status indicator of some description. Another way is for the MAC management function to be instructed that all subsequent transmission requests are to be treated as 'normal' or 'persistent'.

The following table provides an example of the parameters that might be included with a transmission request besides the messages contents. The TxOptions field allows some control over how the packet is transmitted.

| Name | Type | Valid range | Description |
|---|---|---|---|
| Destination Address | Integer | 0xffff or 64-bit integer | The 64-bit individual device address of the entity to which the outgoing frame is to be transferred. |
| Message Length | Integer | ≤aMaxMACPayloadSize | The number of octets contained in the Message. |
| Message | Set of octets | — | The set of octets forming the Message to be transmitted. |
| Message Handle | Integer | 0x00-0xff | The internal handle associated with the Message to be transmitted by the MAC. |
| TxOptions | Bitmap | 5-bit field | Transmission options for this Message. |

| TxOptions bit | Value | Description |
|---|---|---|
| $b_3$ | 0 | Persistence mode not activated |
|  | 1 | Persistence mode activated |

Since the Logical Link Control (LLC) layer has as one of its functions the task of multiplexing information streams from multiple sources, yet another method is to instruct the LLC to treat incoming packet requests as 'normal' or 'persistent' according to the source of the request and thereby set the aforementioned 'persistence' flag appropriately as it passes the request onto the MAC. Variations on these general methods are also possible.

Now, if the rule was that the persistent request simply remained at the front of the queue 24, this would mean that while this request remains active, then all other requests that might be present in the queue 24 would be blocked and would not be transmitted. Therefore to avoid this situation, the coded light controller 20 is configured so that, after transmission, active persistent transmission requests will be re-inserted at a place in the queue 24 other than the front. This enables one or more other transmission requests to be interspersed between successive transmissions of the persistent request.

In embodiments the position at which the request is re-inserted in the queue 24 may be a fixed or globally settable parameter of the coded light controller 20, i.e. persistent requests are always re-inserted at a certain position in the queue, such as the back of the queue. Alternatively, the transmission request may be supplied from the source 12 with a number that represents the intended post-transmission queue placement, with the coded light controller 20 being configured to re-insert the request accordingly. In one possible arrangement, positive integers represent a place counting from the front of the queue, where 1 is the first place, while negative integers represent a place counting from the back of the queue, where −1 is the last-most place. In this arrangement, zero may be used to indicate that the request is not persistent.

In embodiments therefore, the queue rules are:
- whenever the queue 24 is non-empty, the MAC 20 will process the request at the front of the queue;
- all new requests join at the back of the queue 24; and
- after transmission, requests are discarded from the queue 24, or, if persistent, are replaced in the queue according to the supplied queue placement number.

Figure 12:
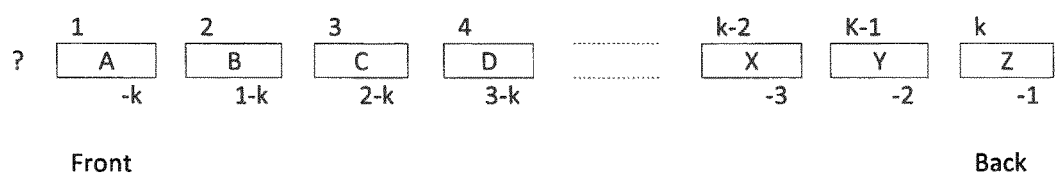

FIG. 12 shows a queue of k requests with positive and negative labels for comparison. In embodiments k may vary dynamically and, if, at the time of queue placement, the magnitude of the queue placement number associated with the request is greater than the current value of k, then the magnitude of k shall be used instead.

The effect of positive numbers greater than 1 is to allow other requests a chance to be transmitted. It is possible for these requests also to be persistent requests, meaning that a set of persistent requests can be sent in a repeated cycle or ad-hoc carousel. For example, two requests, each with a queue placement number of 2, will be sent alternately (whilst blocking everything else). Three requests, each with a queue placement number of 3, will be sent in a continuous cycle, and so on. In each case, increasing the queue placement number by 1 or more will allow 'one-shot' requests to pass through, albeit at the cost of temporarily interrupting the cycle.

Figure 13:
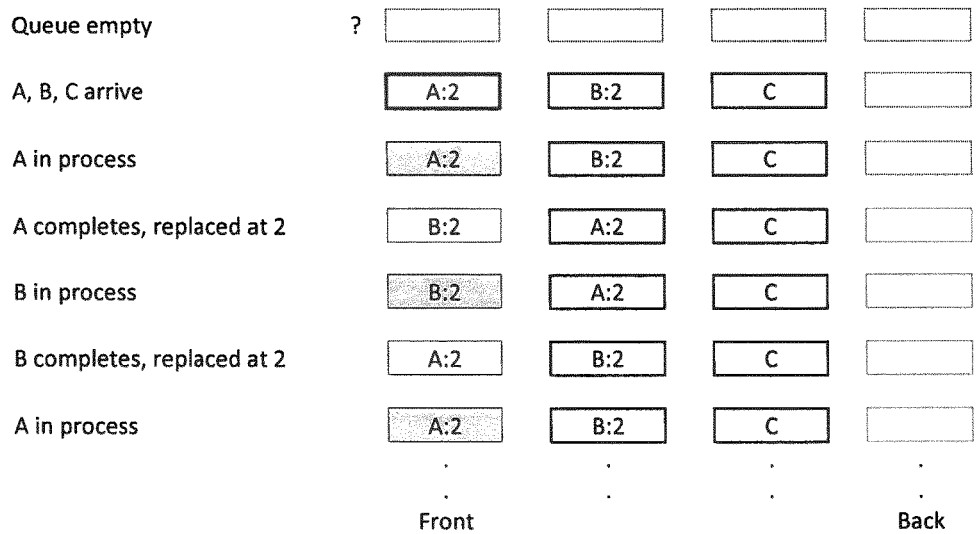

FIG. 13 shows queue operation with two requests being cyclically repeated. Note that request C is blocked and will not be transmitted until at least one of A and B is flushed.

Figure 14:
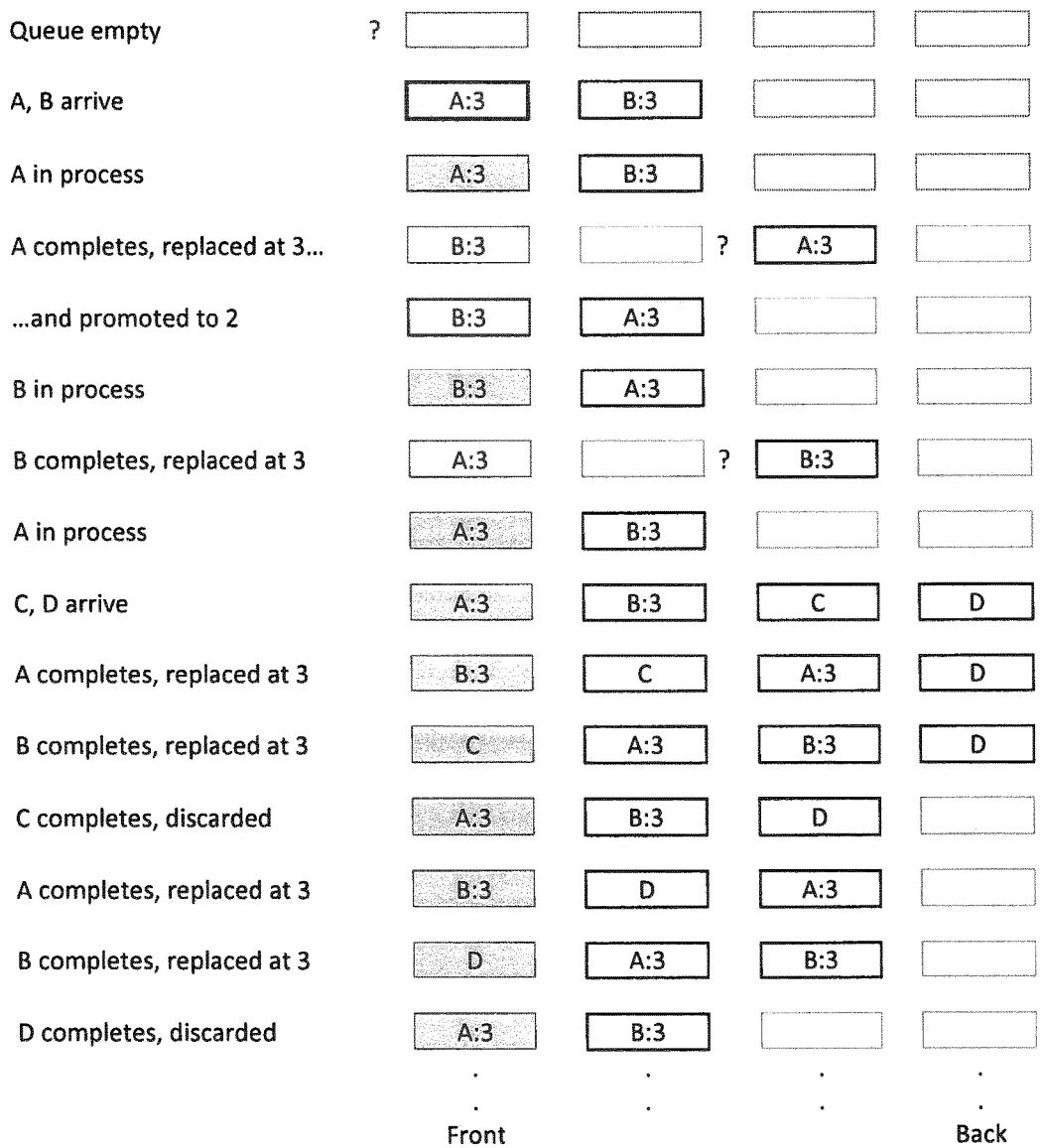

FIG. 14 shows queue operation with two requests, A and B, being cyclically repeated. Two new, one-shot requests, C and D enter the pipeline and are transmitted one-by-one.

Figure 15:
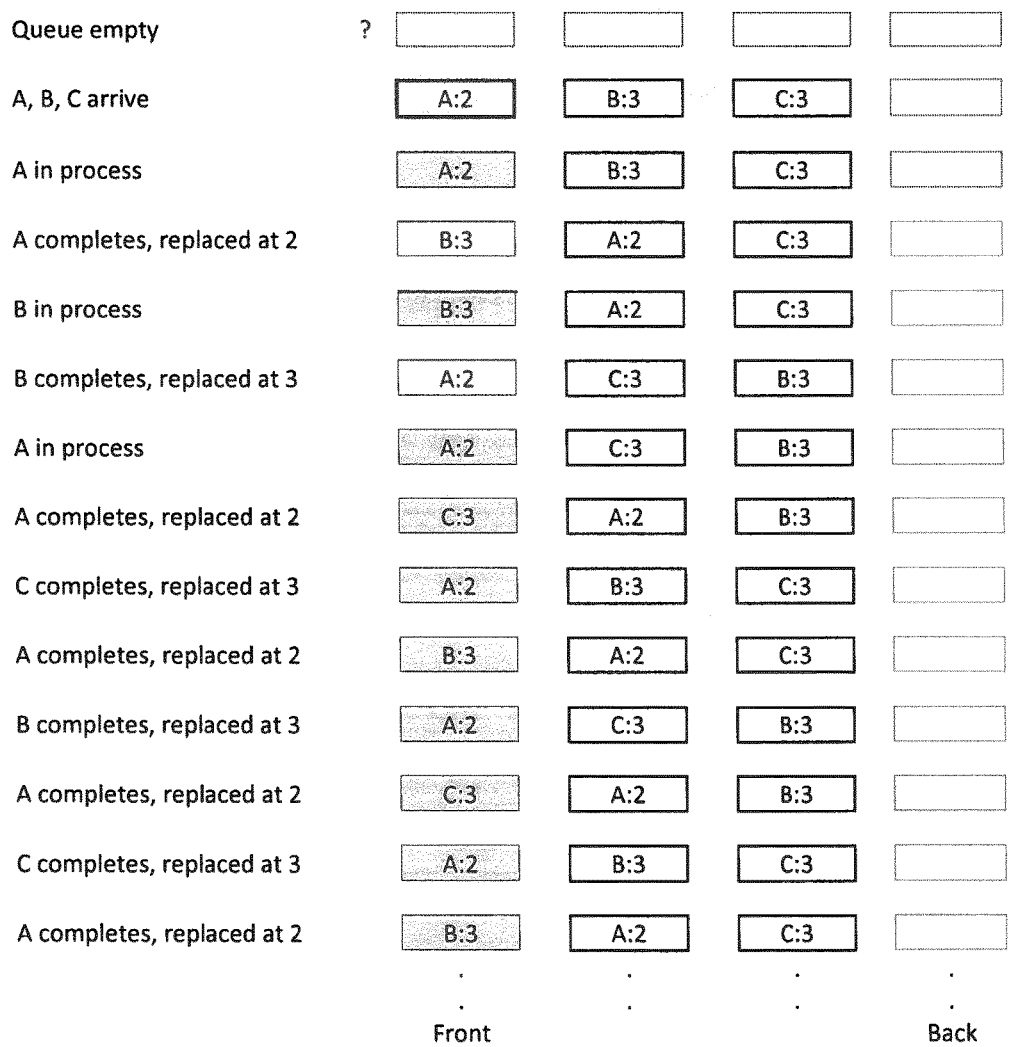

More complex repetition structures can be achieved by allocating requests different queue placement numbers. For example, as shown in FIG. 15, if request A has a queue placement number of 2 and requests B and C have 3, then the following pattern is transmitted: A B A C A B A C . . .

By definition in the example scheme above, the number −1 refers to the back of the queue. Thus, a persistent request with this number will always be replaced at the back no matter how long the queue happens to be.

The effect of negative queue placement numbers below −1 is to allow the persistent request to push in front of requests at the back of the queue. There may be applications that find this useful.

According to the above, a transmission request marked as 'persistent' will never be deleted and will therefore be repeated continually. For instance, one consequence of this is that other transmission requests may be blocked (e.g. in the example of FIG. 12) and cannot be serviced while the persistent request is active. It may be convenient to provide means of removing a persistent request from the queue 24.

To facilitate this, the MAC 'flush' mechanism described earlier allows an application to request the removal of a persistent request, in which case it is removed immediately (although an in-progress transmission may be allowed to complete).

Figure 16:
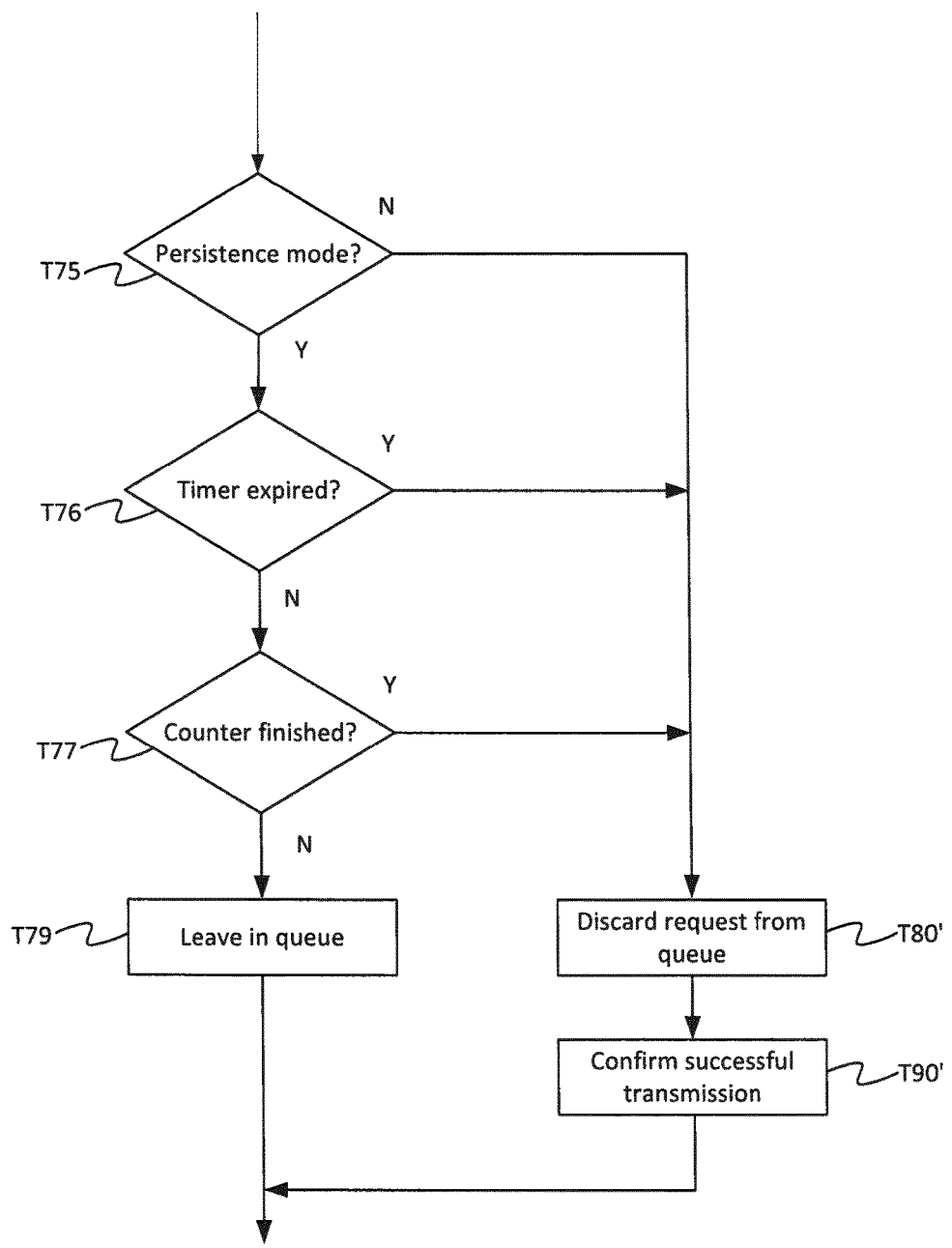
FIG. 16 is another portion of flow chart showing steps of a transmission process.

Alternatively or additionally, the transmission request may contain one or more instructions that cause the MAC 20 to terminate the request automatically on the occurrence of a suitable event. For example, in embodiments the request may specify the expiry of a timer or a transmission counter or a combination thereof. Either or both can be added to the process which the coded light controller 20 is configured to perform. FIG. 16 shows how a timer and a counter can be added to the control flow of FIGS. 6 and 11. In this arrangement, the persistent request is discarded when either the timer or the counter expires. After entering persistence mode from Step T75, the MAC transmission handler 27 proceeds to step T6 where it checks whether the timer has expired relative to the value specified in the persistent request. If so it branches to steps T80' and T90' where it discards the request (T80') and confirms transmission (T90'). Otherwise the MAC transmission handler 27 branches to step T77 where it checks whether the transmission counter has expired relative to the value specified in the persistent request (a certain number of transmissions or re-transmissions). If so it branches to steps T80' and T90' where it discards the request (T80') and confirms transmission (T90'). Otherwise it proceeds to step T79 where the request is re-inserted back in the queue.

The control flow can also be arranged in other ways, for example, to require that both timer and counter expire before a persistent request is discarded. It will also be appreciated that steps T76 and T77 can be implemented the other way round, or only one of these steps may be included. Further, the confirmation step T90' may or may not be involved after the expiry.

In another example, the timer or counter could be a fixed or globally settable parameter of the coded light controller 20, i.e. persistent requests are always discarded after n repetitions or t ms (or seconds, etc.).

Up to now, it has been assumed above that new requests join the queue 24 at the back. Because several persistent requests can be operational simultaneously, a new request may therefore have some waiting to do before it can be transmitted. An alternative arrangement allows a new request to join the queue 24 at the point indicated by the queue placement number. This provides a basic priority mechanism that allows the new message to 'jump' the queue. One consequence of this is that, if this new message is persistent and requests entry near the front of the queue (as the non-zero queue placement number would indicate), it might subsequently block other messages. A more sophisticated approach therefore is to provide a separate number for the initial queue placement. I.e. transmission requests are allowed to request a specific place in the queue for their first transmission. For example, an initial number of 1, coupled with a persistence number of −1 enables a request to be transmitted quickly and then remain in the queue as a 'background' request. Or as another example, one-shot requests may request a place as near to the front as possible so that they can be sent without having to work their way through any incumbent carousel.

Another optional feature is dynamic queue placement. For example, the coded light controller 20 may be equipped with a timer and/or transmission counter to manipulate the queue placement number as the time or number of transmissions progresses, e.g. to lower the transmission priority after an initial announcement or to raise the transmission priority as a deadline approaches.

The following exemplary table shows how the operation of persistence mode, including some of the further elaborations described above, may be controlled by a controller application running on a component like the luminaire system controller 12. Persistence mode is supported on a per-packet (per message) basis and the table represents the parameters that are conveyed in each respective transmission request. In one exemplary scheme, the first four parameters may be specified as mandatory and therefore expected to be present in some form or other in all systems. The remaining may be optional, and may be ignored by an application that does not wish to use persistence functionality or may be unsupported by a coded light implementation that does not offer persistence functionality. In the former case, sensible default values may be assumed by a supporting MAC.

Note that, as described previously, in embodiments the Queue Initial Placement Number parameter operates independently of persistence mode. Persistence mode itself is switched on or off by the Queue Replacement Number parameter (0=off) and a similar approach is used for timer and counter control.

| Name | Type | Valid range | Description |
| --- | --- | --- | --- |
| Source Identifier Mode | Enumerated type | None, fixed, programmable | Controls whether a source identifier stored in the MAC is sent with the packet. Source can be hard-coded or field-programmable |
| Payload | Set of octets | — | The set of octets forming the payload to be transmitted. |
| Payload Length | Integer | 0-MaxPayload | The number of octets contained in the payload. |
| Request Handle | Integer | 0-255 | The internal handle associated with the transmission request. |
| Queue Initial Placement number | Integer | −128-+127 | Optional parameter that specifies the position in the queue that a request assumes on arrival. Default value is −1 (back of queue). |

| Name | Type | Valid range | Description |
| --- | --- | --- | --- |
| Queue Replacement Number | Integer | −128-+127 | Optional parameter that specifies the position in the queue that a persistent request assumes after transmission. Default value is 0 (no persistence). |
| Persistence Timer | Integer | $0\text{-}(2^{24}-1)$ | Duration in symbol periods before request is automatically discarded. Default value is 0 (timer not used). |
| Persistence Counter | Integer | 0-65535 | Number of transmissions before request is automatically discarded. Default value is 0 (counter not used). |
| Counter/timer logic | Enumerated type | AND, OR | If both timer and counter activated, controls whether both must expire (AND) before request is discarded or whether request is discarded when either one expires (OR). Default value: OR. |

The persistence mode thus takes a basic FIFO (first-in, first-out) queue, and adds an extra ability in the queue handling to support more sophisticated queuing behavior with low complexity and low overhead modifications to FIFO operation. The key aspect of this is the ability of persistent transmission requests to remain in the queue and, in some cases, to 'jump the queue' by (re-)entering somewhere other than the back. Applications (in embodiments plural) that use persistence mode can tell the queue handler how to handle a given transmission request by means of simple settings and with minimal or no negotiation with other applications.

Preferably, the coded light controller 20 gives the ability to send a request to any point in the queue, not just front or back. Amongst other things, this can be used to allow certain repeating messages to be transmitted more frequently than others.

One purpose of being able to send a persistent request to the back of a queue, rather than the front, is to establish a 'default' message that gets sent when there is nothing else to send. In this case, the indication to send the request to the back of the queue effectively serves as a "default" flag. This mechanism also allows two or more fixed messages to be established as part of an ad hoc carousel. This may be valuable in situations where (a) it is not known in advance how many messages will form the carousel (and, anyway, this can be changed dynamically); (b) there can be multiple request sources that don't need to interact with each other; and/or (c) it is desired that 'one-shot' messages can still be sent through the carousel.

For example, a luminaire might be arranged to transmit a cycle of packets that might convey current status values of different on-board sensors: temperature, ambient light level, motion detector, etc.

As an aside, note that if a queue is empty and it is specified that a request is to be positioned at, say, −2, then depending on implementation, the controller may either insert the request at the queue of the buffer, or the controller may add two nulls and place it after that. Or more generally, if it is specified that a request is to be inserted or re-inserted at a point farther back than the next place back from where queue is currently filled to (e.g. the queue is currently filled to 2 and the request is to be inserted or re-inserted 4 places from the front), the controller may move this request immediately forward or may insert null entries to "pad out" the difference. In embodiments, the controller may preferably be configured to insert such as request at the front of the queue in such a situation (or as far forward as the queue is currently filled), but if null requests are meaningful in some manner (for example, they cause delays to be applied) then in alternative embodiments they may be added.

As described above, one application of the disclosed techniques is to beaconing, such as the beacon signal emitted by a luminaire 4 for location purposes. In such cases, a system controller may load up a beacon with a carousel of messages to send according to certain cycle requirements (e.g., some messages being repeated more frequently than others) and the beacon would run the carousel indefinitely without further input required from the system controller 12.

In the example of FIG. 3, one particular advantage that can be achieved is reduction of bus traffic, but a similar advantage can also be achieved in terms of reduction of traffic even over a more direct connection between a luminaire system controller 12 and coded light controller 20 as in FIG. 2, or reduction of network and/or wireless traffic in the case where the system controller 12 is physically remote from the coded light controller 20.

Another advantage is that, in embodiments, there can be more than one application that uses the coded light transmitter 14, 16, 18. For instance, while an indoor positioning network might be interested in sending a repeating identity message or set of identity messages, other applications might also be interested in sending occasional updates from sensors (e.g., motion sensors, temperature sensors) or other data sources. The disclosed mechanism allows the latter applications to send packets that temporarily interrupt the continuous identity stream without any interaction required between the different applications or the need for any other coordination function other than coded light: the queuing mechanism handles it automatically.

It will be appreciated that the above embodiments have been described by way of example only.

For instance, in some alternative applications, the coded light emitter 4, 18 might not have an illumination function at all. In that case, visible light or invisible infra-red light can be used as the medium for transmitting the messages. Further, the techniques disclosed herein may also be applied outside the field of coded light, to communications systems using other transmission media, such as, but not limited to, radio. In embodiments the disclosed techniques are applied in a broadcast environment where the messages are transmitted over at least a region of an environment to be receivable by any suitably equipped devices 8 that happen to be present. Alternatively however the disclosed techniques may be applied in other communication environments where the messages are transmitted selectively to one or more specified destinations. Generally, anything said above of the luminaire system controller 12 or an application issuing requests may apply to any source of transmission requests, e.g. with a higher level API being able to set a "persistence" flag and/or manipulate the queue contents. Similarly, anything said above of the coded light controller 20 or MAC, may apply to any controller of a transmitting device which receives transmission requests from any source.

An example application outside the coded light field would be to analogue teletext, which could be implemented by suitably-scaled persistence mode techniques. At any one time, there are a number of active 'magazines' within the overall carousel, serving pages without obvious reference to other magazines. Provisions are made at the broadcasting end to add, delete or change pages within a magazine and some pages, e.g. the index page 100, may be transmitted within the carousel more frequently than others.

Another example would be airport flight status information boards. E.g. these could use the dynamic queue placement feature. By way of illustration, an initial announcement at an airport that a gate for a particular flight might receive high priority to begin with but drop down in priority as time goes by. On the other hand, a 'final boarding' announcement might begin at a relatively low priority but increase to high priority as the boarding deadline approaches.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A transmitting device comprising:
a transmitter; and
a controller for receiving transmission requests from a request source, each of the transmission requests requesting transmission of a corresponding message from the transmitter;
wherein the controller comprises a queue for queuing data in a sequence of queue places, the controller being configured to queue the transmission requests in respective ones of the places in an order from a front of the queue backwards, and to enact the transmission request at the front of the queue by controlling the transmitter to perform the transmission of the corresponding message; and
wherein the controller is configured to detect that at least one of said transmission requests is to be treated as a repeating request, and in response to re-insert the repeating request in the queue in one of places farther back than the front after transmission of the corresponding message, so as to retransmit the corresponding message at least once.

2. The transmitting device of claim 1, wherein the transmitter comprises a light source for emitting light, and the controller comprises a controller of the light source configured to perform said transmission by modulating the message into the light emitted by the light source.

3. The transmitting device of claim 2, wherein the transmitting device comprises a luminaire, the light source comprises a lamp for emitting illumination to illuminate an environment, and the controller comprises a local controller of the luminaire configured to perform said transmission by modulating the message into the illumination emitted by the lamp.

4. The transmitting device of claim 1, wherein the controller is configured to detect that at least one of said transmission requests, but not others, is to be treated as a repeating request, and in response to re-insert the repeating request in the queue in one of places farther back than the front after transmission of the corresponding message, so as to retransmit the corresponding message at least once, each of the other transmission requests being discarded from the queue once the corresponding message is transmitted.

5. The transmitting device of claim 1, wherein the transmitter is configured to perform said transmission by broadcasting the message.

6. The transmitting device of claim 1, wherein the controller is configured to receive an indication marked in said at least one transmission request indicating that it is to be treated as a repeating request, said detection comprising detecting said indication.

7. The transmitting device of claim 6, wherein the indication indicates how far back in the queue the repeating request is to be re-inserted after the transmission of the corresponding message, indicating one of the places in the queue; the controller being configured to re-insert the repeating request at the indicated place in the queue after the transmission of the corresponding message.

8. The transmitting device of claim 1, wherein the controller is operable to dynamically adapt how far back in the queue the repeating request is re-inserted after the transmission of the corresponding message.

9. The transmitting device of claim 1, wherein the controller is operable to remove the repeating request from the queue after one or more of the retransmissions of the corresponding message.

10. The transmitting device of claim 9, wherein the controller is operable to remove the repeating request from the queue after a predetermined time, or after a predetermined number of the transmissions or retransmissions of the corresponding message.

11. The transmitting device of claim 10, wherein the indicator received in the repeating request indicates said predetermined time or predetermined number; the controller being configured to remove the repeating request from the queue after the predetermined time or the predetermined number of transmissions or retransmissions of the corresponding message as indicated by said indicator.

12. The transmitting device of claim 6, wherein the indication further indicates where the repeating request is to be initially inserted in the queue prior to the initial transmission of the corresponding message, indicating one of the places in the queue; the controller being configured to initially insert the repeating request at the indicated place in the queue prior the initial transmission of the corresponding message.

13. The transmitting device of claim 1, wherein the controller is configured to receive an indication marked in one of said other requests indicating where it is to be initially inserted in the queue prior to the transmission of the corresponding message, indicating one of the places in the queue; the controller being configured to initially insert said one of the requests at the indicated place in the queue prior the transmission of the corresponding message.

14. A computer program product comprising code embodied on one or more non-transitory computer-readable storage media and/or being downloadable therefrom, and being configured so as when run on one or more processors to perform operations of:
  receiving transmission requests, each requesting transmission of a corresponding message from a transmitter;
  queuing the transmission requests in a queue, in respective queue places in an order from a front of the queue backwards, and enacting the transmission request at the front of the queue by controlling a transmitter to perform the transmission of the corresponding message;
  detecting that at least one of said transmission requests is to be treated as a repeating request; and
  in response to said detection, re-inserting the repeating request in the queue in one of the places farther back than the front after transmission of the corresponding message, so as to retransmit the corresponding message at least once.

15. A source device for sending requests to a transmitting device to be queued in respective places in a transmission queue of the transmitting device in an order from a front of the queue backwards, each transmission request requesting transmission of a corresponding message from the transmitting device;
  wherein the source device is configured to include in at least one of said transmission requests, but not others, an indicator indicating that said at least one transmission request is to be treated as a repeating request, such that when the repeating request is received by the transmitting device, the indication will cause the transmitting device to re-insert the repeating request in the queue after transmission of the corresponding message so as to retransmit the corresponding message at least once, each of the other transmission requests being discarded from the queue once the corresponding message is transmitted; and
  wherein the source device is configured to include in the repeating request an indicator indicating how far back in the queue the repeating request is to be re-inserted after the transmission of the corresponding message, indicating one of the places in the queue, such that the transmitting device will be controlled to re-insert the repeating request at the indicated place in the queue after the transmission of the corresponding message.

* * * * *